May 31, 1966    L. A. ROMANO    3,253,488
VIBRATION DAMPENER
Filed April 9, 1964    3 Sheets-Sheet 1
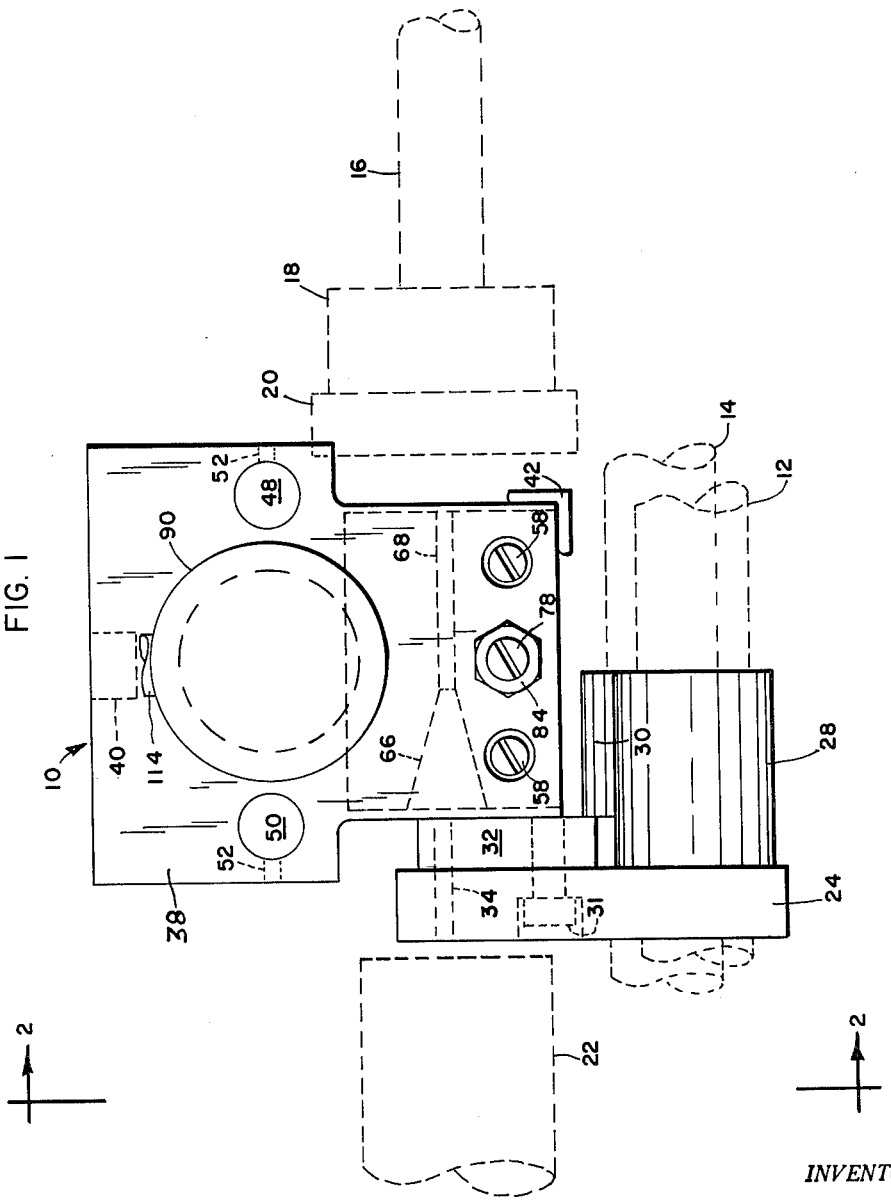
INVENTOR.
LEWIS A. ROMANO.
BY
D. Emmett Thompson
HIS ATTORNEY.

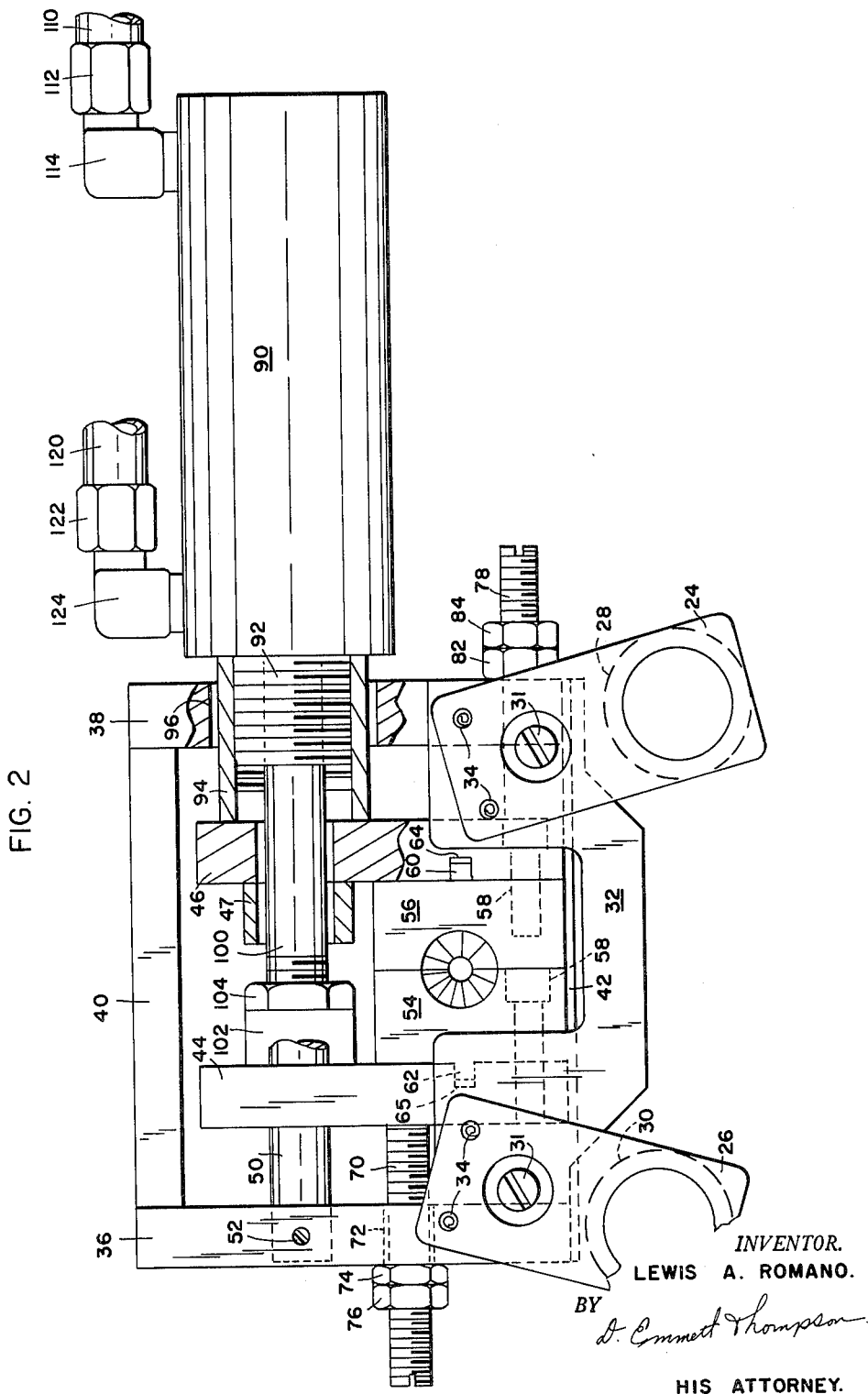

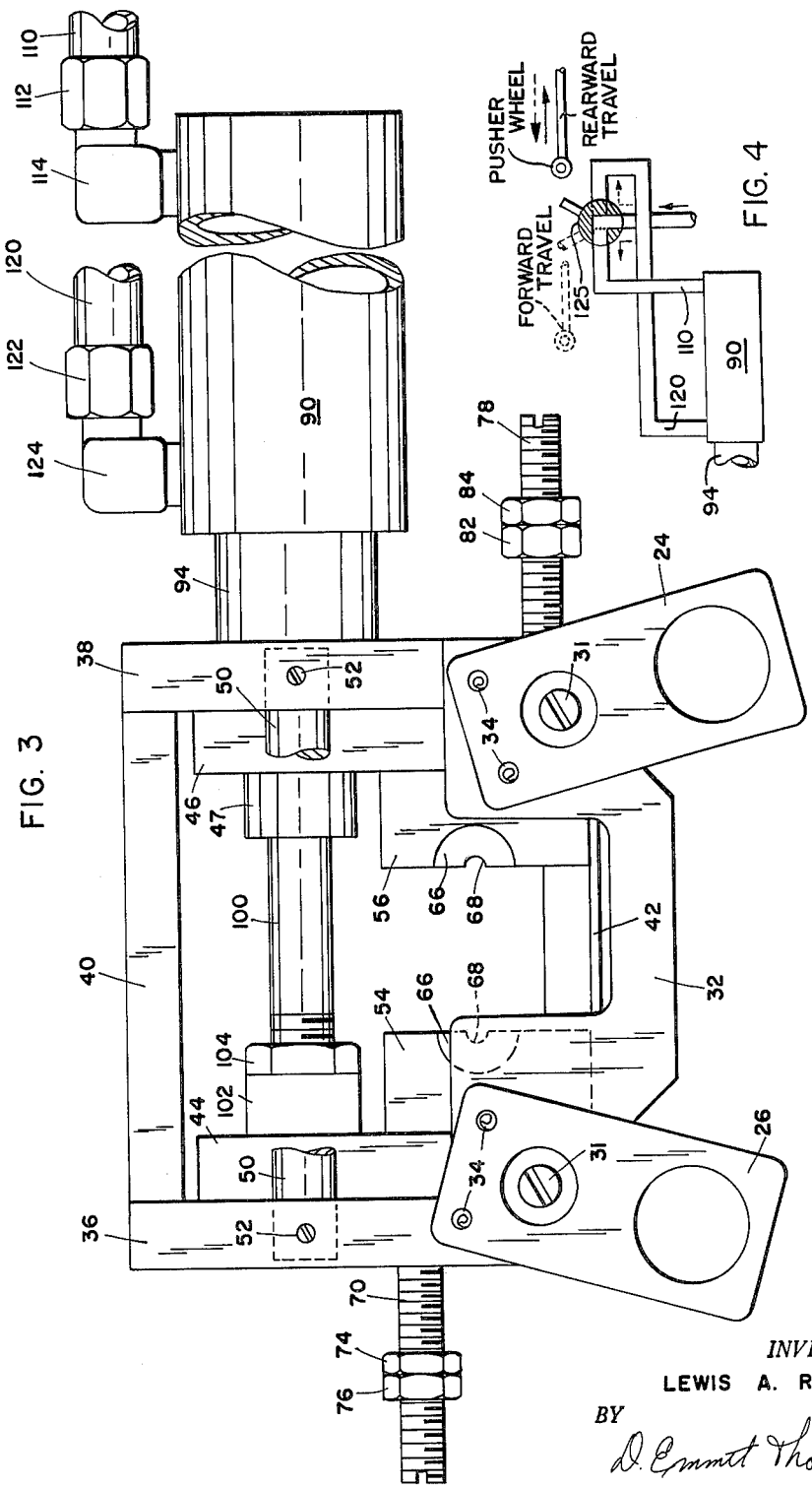

United States Patent Office 3,253,488
Patented May 31, 1966

3,253,488
VIBRATION DAMPENER
Lewis A. Romano, Solvay, N.Y., assignor to Lipe-Rollway Corporation, Syracuse, N.Y., a corporation of New York
Filed Apr. 9, 1964, Ser. No. 358,582
1 Claim. (Cl. 82—38)

In present day bar working machines, such as lathes, the bar stock is intermittently fed into the lathe and is rotated by the lathe at high speed, during which the various tooling operations are performed so as to form a work piece. Such operations are automated to the extent that the feed of the bar stock into the lathe is accomplished by automatic magazine loading bar feed machines. In order to increase the productive output from such bar feeding and bar working machine setups, the bar working machine rotates the bar stock at very high speeds, whereby the time utilized by the tooling to form the work piece is reduced to a minimum.

In such arrangements, however, the bar feed machine stock tube is necessarily formed with a bore of large diameter in order to accommodate the largest diameter bar stock to be used by the setup. This gives rise to the problem, however, that where small diameter bar stock is used, there is a great amount of play between the stock tube and the rotating bar stock, which causes the bar stock to whip and vibrate, which can be harmful to the setup. This whip and vibration is especially harmful in the gap between the forward end of the stock tube and the rearmost end of the bar working machine collet, and is especially difficult to eliminate in this area.

Accordingly, it is a general object of the invention to provide bar working and bar feeding machine setups with vibration dampening means.

It is a more specific object of the invention to provide a vibration dampener mechanism operable in the gap between the bar feed machine and the bar working machine, which will normally function to prevent excessive whip and vibration of the bar stock as it is being fed from the bar feed machine into the bar working machine, and in addition will be operable to permit the bar feed pusher mechanism to pass through the vibration dampener and into the rearward end of the collet of the bar working machine.

The invention consists in the novel features and constructions and the method hereinafter set forth and claimed.

In describing the invention, reference is had to the accompanying drawings in which like characters designate corresponding parts in all the views.

In the drawings:

FIGURE 1 is a side elevational view of a preferred embodiment of the invention, shown located in the gap between the end of the bar feed machine, shown in phantom lines to the left of FIGURE 1 and the end of the bar working machine, shown in phantom lines to the right of FIGURE 1.

FIGURE 2 is a view taken looking in the direction of the arrows of line 2—2 on FIGURE 1.

FIGURE 3 is a view similar to FIGURE 2, with the mechanism shown in a different position of operation.

FIGURE 4 is a schematic illustration of a portion of the control system.

As best seen in FIGURE 1, the vibration dampener, generally indicated at 10, is mounted on a pair of rods 12 and 14, which are carried by the bar working machine, which in this case and by way of example, may be a high speed lathe. The lathe includes a spindle liner 16 carried in the lathe collet, which extends rearwardly from the bar working machine, and terminates in a pair of collars 18 and 20 of stepped-up diameters.

The machine end of the bar feed stock tube is indicated at 22, and for purposes of illustration may be considered to be the bar feed tube of a bar feed machine of the type shown in Patent 3,092,288, issued June 4, 1963, to F. D. Lakins et al. Accordingly, it will be seen that there is a significant gap between the outer end of the stock tube 22, and the rearward end 20 of the spindle liner bar working machine, and that the vibration dampener constituting the subject of this invention is mounted on the rods 12 and 14, so as to be located in this gap.

Referring now to FIGURES 1 and 2, the vibration dampener mechanism comprises a pair of arms 24 and 26, which have cylindrical bored hubs 28 and 30 affixed thereto by any suitable means such as welding. The arms 24 and 26 are drilled to provide apertures in line with the bore in the hubs 28 and 30, whereby to permit the hubs to pass over the rods 12 and 14 to mount the mechanism 10 on the rods 12 and 14. As best seen in FIGURE 2, the upper ends of the arms 24 and 26 are affixed by means of bolts 31 to a cross-piece 32, and after the arms 24 and 26 are located in selected angular positions of adjustment to pass over the rods 12 and 14, the bolts 31 are utilized to clamp the arms to the frame piece 32 and upon final installation, the arms 24 and 26, and the frame 32 are drilled, and each of the arms is pinned to the frame member 32 by a pair of roll pins 34.

Suitably affixed to the outer ends of the frame member 32 are a pair of side plates 36 and 38, the plates 36 and 38 being connected together at their top edges by a cross arm 40. The opposite edges of the plates 36 and 38 are affixed together by an angle rail 42, best seen in FIGURE 1, and the members 32, 36, 38, 40 and 42 are affixed together by any suitable means, such as welding, and may be termed the cage assembly.

Carried between the inner faces of the side frames 36 and 38 are a pair of clamp plates 44 and 46. The clamp plates are mounted for sliding movement on a pair of slide rods 48 and 50, which are affixed in apertures formed in the side plates 36 and 38 by means of set screws 52, see FIGURE 1.

The lower edges of the clamp plates 44 and 46 have vibration dampener guide blocks affixed thereto. The guide block 54 being termed a lefthand block, while the block 56 is termed a righthand block. The blocks 54 and 56 are affixed to the lower edges of the clamp plates 44 and 46 by screws 58, each of the blocks and plates being provided with a pair of these screws 58 to securely fix the blocks to the plates. In addition, the blocks 54 and 56 are provided at their outer sides with transversely extending and upstanding ribs 60 and 62, which are received in complementally formed grooves 64 and 65, located in the plates 46 and 44, respectively.

As clearly seen in FIGURES 1 and 2, each of the blocks 54 and 56 are provided along their medial portion of their inner faces with one-half of a bell mouth, or tapered aperture 66, which terminates at its inner end in a through bore 68. The conical or tapered bore 66, and the straight bore 68 form the guide passage for the bar stock, the tapered bore 66 serving to initially receive the bar stock and guide and center it in the through bore 68.

As best seen in FIGURE 2, the clamp plate 44 has a tapped aperture in its outer face to threadedly receive a set screw 70, which passes through a clearance aperture 72 formed in the outer side plate 36. The outer end of the set screw 70 is provided with a pair of jam nuts 74 and 76, which may be affixed in any selected position along the length of the set screw 70, so as to regulate the inner limit of travel of the clamp plate 44, and in turn the guide block 54. The opposite clamp plate 46 is likewise provided with a set screw 78 which is received in a tapped aperture formed in the outer face of the plate 46 and which passes through a clearance aperture formed in the plate 38, and is similarly provided with a pair of jam nuts 82 and 84. As will be obvious, the set screw 78 and jam nuts 82 and 84 function to limit the inner movement of travel of the plate 46 and block 56.

As seen in FIGURE 2, the blocks 54 and 56 are in the closed position ready to receive and guide a piece of bar stock therethrough, and to dampen out whip and vibration of the bar stock as it is rotated at high speed by the bar working machine. As the pusher assembly in the bar feed machine approaches the forward end of the stock tube 22, a valve is tripped to actuate the mechanism for separating the blocks 54 and 56 to permit the pusher mechanism to pass between the blocks to feed the remainder of the bar stock into the spindle liner 20 of the bar working machine.

The mechanism for effecting this opening movement comprises a double-acting pneumatic, or hydraulic cylinder 90, which is provided at its forward end with a mounting nose or boss 92. The rearward face of plate 46 is formed with a rearwardly extending hub 94 affixed thereto, the hub 94 passing through a clearance aperture 96 formed in the plate 38. The exterior portion of the boss 92 on the cylinder 90 is threaded, and a portion of the bore of the boss 94 is complementally threaded to threadedly attach the cylinder to the boss 94. The piston rod 100 of the cylinder passes through a clearance aperture formed in the boss 92 and through the bore of the hub 94 through similar clearance apertures in the plate 46 and a spacer block 47 affixed to the inner face of plate 46, and is threaded into a tapped aperture formed in the plate 44. The inner face of the plate 44 is provided with a welded spacer block 102 affixed thereto, and a jam nut 104 is threaded on the rod 100 to rigidly affix the rod to the plate 44.

Accordingly, it will be seen that when the valve 125 shown in the schematic illustration of the control system shown in FIGURE 4 on the bar feed machine is tripped signalling the approach of the bar feed pusher mechanism to the forward end of the stock tube, the tripping of the valve 125 will function to supply fluid under pressure via the line 110 and fittings 112 and 114 to the rearward end of the cylinder 90, causing the piston rod 100 to advance. This will cause the plate 44 and block 54 to move on the slide rods 48 and 50 until the outer face of the plate 44 engages the inner face of the side plate 36, halting any further movement of the plate 44 and block 54. At this point, the reaction to the admission of pressure to the rearward end of cylinder 90 will cause the cylinder 90 to move rearwardly on the piston, whereby to move the plate 46 and the block 56 to the right, from the position shown in FIGURE 2 to the position shown in FIGURE 3, the amount of this movement being regulated by the distance between the outer face of clamp plate 46, and the inner face of the frame plate 38.

At this point, the dampener mechanism is in the position shown in FIGURE 3, with the blocks 54 and 56 separated so as to permit bar feed pusher mechanism to feed the bar stock through the open blocks and into the spindle liner 20. After completion of the forward feed, the pusher mechanism is moved rearwardly through the still open blocks 54 and 56, toward the rearward end of the bar feed machine. Again, the valve 125, which was previously actuated to admit pressure to the outer end of cylinder 90, is returned to its initial position, in which position fluid under pressure is now admitted by line 120 and fittings 122 and 124 to the forward end of cylinder 90. This will cause the piston rod 100 to retract, and the block 54 and plate 44 to move inwardly, the amount of this travel being controlled by and halted by the jam nut 74 on set screw 70. When the block 54 has reached its innermost position, the continued admission of fluid pressure to the forward end of cylinder 90 will cause the cylinder to move to the left, as viewed in FIGURE 3, to move the plate 46 and block 56 inward until halted by the jam nut 82 carried by the set screw 78, and the mechanism will be returned from the position shown in FIGURE 3 to that shown in FIGURE 2, to permit the new piece of bar stock to pass through the conical aperture 66, and the straight bore 68, in order to dampen vibrations of the bar stock as it is being rotated by the bar working machine.

What I claim is:

Vibration dampening means for use on a bar feeding and bar working machine having a pusher mechanism, and set up between the forward end of the bar feed stock tube and the rearward end of the spindle liner of the bar working machine, said vibration dampening means including a pair of movable guide blocks normally in a closed position having a through aperture therein formed in axial alignment with the feed tube of the bar feeding machine, said aperture being of a diameter to permit through feed of bar stock and prevent excessive vibration of the bar stock upon high speed rotation of the bar stock by the bar working machine, control means operable to separate said guide blocks upon approach of the pusher mechanism from the bar feed machine to said blocks to permit the pusher mechanism from said bar feed machine to pass forwardly therethrough, said control means being operable to return said guide blocks to the closed feed position upon return movement of the pusher mechanism, and centering means formed in said guide blocks to center a new piece of bar stock in said through aperture.

References Cited by the Examiner

UNITED STATES PATENTS 2,576,114 11/1951 Hibbard _____ 82—913 X
2,608,746 9/1952 Harney _____ 82—2.5 X

FOREIGN PATENTS 507,855 11/1954 Canada.
533,333 7/1932 Germany.

WILLIAM W. DYER, Jr., *Primary Examiner.*

LEONIDAS VLACHOS, *Examiner.*